Aug. 28, 1923.                                              1,466,178
                        S. LANGE
                         TRAP
              Filed Aug. 14, 1922           2 Sheets-Sheet 1
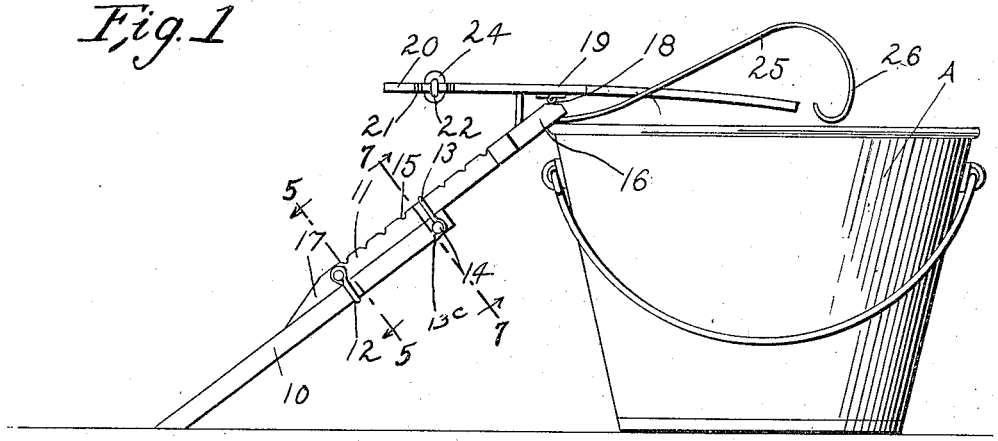
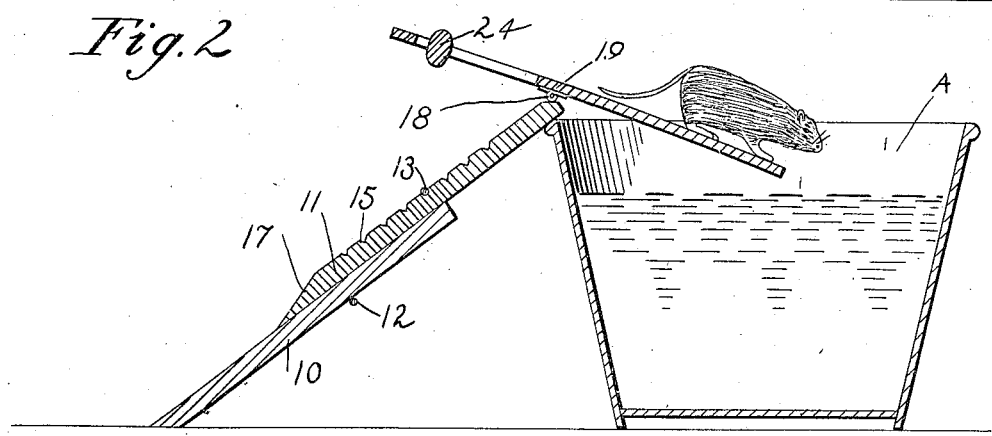
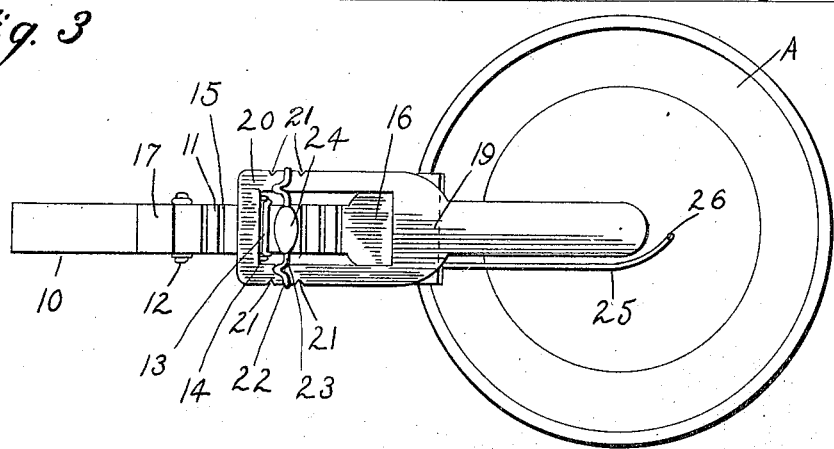
Severin Lange
INVENTOR Aug. 28, 1923.

S. LANGE

TRAP

Filed Aug. 14, 1922    2 Sheets-Sheet 2

1,466,178

Severin Lange
INVENTOR

BY Victor J. Evans
ATTORNEY

WITNESS: J. E. Cole

Patented Aug. 28, 1923.

1,466,178

UNITED STATES PATENT OFFICE.

SEVERIN LANGE, OF BEAR SPRING, MONTANA.

TRAP.

Application filed August 14, 1922. Serial No. 581,734.

*To all whom it may concern:*

Be it known that I, SEVERIN LANGE, a citizen of the United States, residing at Bear Spring, in the county of Fergus and State of Montana, have invented new and useful Improvements in Traps, of which the following is a specification.

This invention relates to traps and has for its object the provision of a novel device designed to be used in connection with a pail, wash boiler, tub or the like, preferably containing water, and including a pivoted platform on to which the animal is lured and from which it is subsequently precipitated into the receptacle and drowned.

An important object is the provision of a device of this character which is adjustable so that it may be used in association with receptacles of any height and which is also provided with an adjustment by means of which it may be regulated for use in catching mice or rats.

An additional object is the provision of a device of this character which will be simple and inexpensive in manufacture, efficient and durable in use, positive in action and a general improvement in the art.

With the above and other objects and advantages in view the invention consists in the details of construction to be hereinafter more fully described and claimed and illustrated in the accompanying drawings in which:

Figure 1 is a side elevation of my device in normal position showing it associated with a receptacle, Figure 2 is a longitudinal section through the device associated with a receptacle and showing it in the act of precipitating an animal thereinto, Figure 3 is a plan view, Figure 4 is an enlarged detail plan view of the pivoted platform showing the weight adjusting means, Figure 5 is a cross sectional view through the run way, along the line 5—5 of Figure 1.

Figure 4:
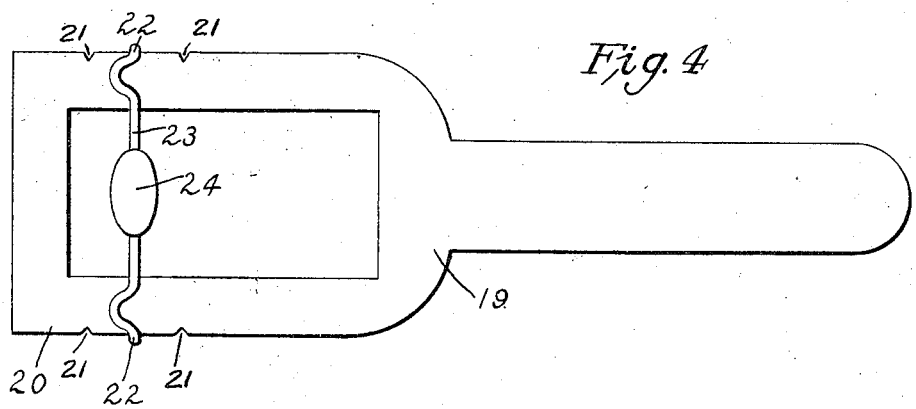
Figure 6:
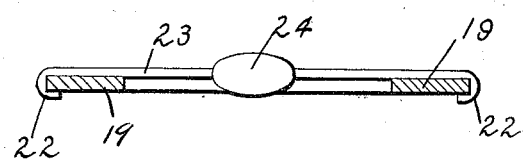
Figure 6 is a cross sectional view through the platform.
Figure 5:
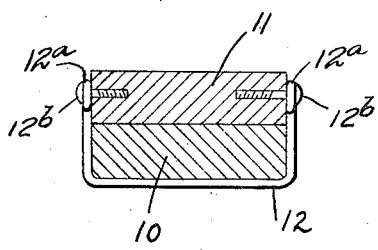
Figure 7:
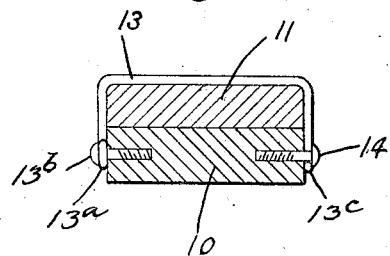
Figure 7 is a cross sectional view through the runway along the line 7—7 of Figure 1.

Referring more particularly to the drawings the letter A designates a receptacle in connection with which my device is used and this receptacle may be either an ordinary pail, wash boiler, tub, barrel or the like. In carrying out my invention I provide an elongated support 10 which in actual practice may be a wooden or metallic bar and upon which is slidably adjustably mounted an elongated bar 11 constituting a run way or approach member, this bar 11 carrying a depending yoke 12 which embracingly engages the support 10 for preventing lateral displacement of the lower end of the approach member with respect to the support. The yoke 12 is formed at its ends with eyes 12$^a$ through which pass securing bolts 12$^b$. The numeral 13 designates a spring yoke which straddles the upper end portion of the bar 10 and which has one end formed with an eye 13$^a$ held to the support 10 by a bolt 13$^b$, and which has its other end formed with a hook 13$^c$ detachably engaged upon a bolt 14 projecting from the other side of the support. The bar 10 is formed throughout its length with a plurality of transverse grooves 15 within any one of which the spring yoke 13 may be engaged for holding the approach member at the desired adjusted position longitudinally of the member 10 so that the device may be used in connection with either short or tall receptacles. The upper extremity of the approach member is preferably widened as indicated at 16 while the lower end is preferably beveled off as indicated at 17 so as not to provide any obstruction to the passage of an animal. Hinged upon the upper edge of the approach member as shown at 18, is a platform 19 which has one end widened as indicated at 20 and overlying the approach member.

This widened portion is formed preferably open as shown and has its edges provided with notches 21 arranged in pairs and within any one of which may be engaged the reflexly bent ends 22 of a spring rod 23 which carries a weight 24 designed to counter balance the platform and holding it normally in a position alining with the approach member. When it is intended that the device be used for catching mice the spring rod 23 is engaged within the notches 21 nearest the pivot point while when it is intended to catch rats the spring rod must be engaged within the notches farther from the pivot point so that the counter balancing effect of the weight may be regulated to meet the different conditions.

Carried by the upper end of the approach member is a wire 25 which has its end formed as a hook 26 operating as a bait holder, this hook being located in advance of the active end of the platform.

In use, the approach member is slid along the support 10 so that the device will be extended sufficiently that it will have a gradual incline when its lower end is supported upon the ground or floor and its upper edge engaged upon whatever receptacle is used. Bait is placed on the hook 26 and the device is then ready for use. An animal attracted by the bait must climb up the approach member and to gain access to the bait must step onto the platform 19. As soon as the animal's weight comes onto the platform beyond the pivot point thereof the platform will swing downwardly precipitating the animal into the receptacle when it will be quickly drowned. The platform automatically returns to normal position ready for the next victim so that the device is always ready for constant service.

While I have shown and described the preferred embodiment of the invention, it is of course to be understood that I reserve the right to make such changes in the form, construction and arrangement of parts as will not depart from the spirit of the invention of the scope of the subjoined claims.

Having thus described my invention I claim:

1. A trap of the character described comprising an elongated bar adapted to be supported in inclined position with its upper end resting upon the upper edge of a receptacle whereby to constitute an approach member, a platform pivoted upon the upper end of the approach member and provided with counter balancing means, and a bait holder carried by the upper end of the approach member and extending beyond the platform, the rear portion of the platform having its side edges formed with pairs of notches, and a weight carrying loop like member of spring formation engaged within selected pairs of said notches.

2. A device of the character described comprising an elongated support, an approach member mounted upon said support and formed with a plurality of transverse grooves, a yoke carried by the lower end of said approach member and embracing said support, and a spring yoke carried by the upper portion of the support and embracing the approach member and engageable within a selected one of said grooves, bait holding means carried by the upper end of the approach member, and a counter balanced platform hinged upon the upper end of the approach member.

In testimony whereof I affix my signature.

SEVERIN LANGE.